United States Patent

[11] 3,596,884

| [72] | Inventor | Edmund Murphy<br>Putney, London, England |
|---|---|---|
| [21] | Appl. No. | 873,726 |
| [22] | Filed | Nov. 25, 1969 |
| [45] | Patented | Aug. 3, 1971 |
| [73] | Assignee | Cooling Developments Ltd.<br>Lucerne, Switzerland |
| [32] | Priority | Nov. 1, 1966 |
| [33] | | Great Britain |
| [31] | | 48,859/66 |
| | | Continuation of application Ser. No.<br>674,184, Oct. 10, 1967, now abandoned. |

[54] COOLING TOWER STRUCTURES
3 Claims, 1 Drawing Fig.

[52] U.S. Cl. .................................................. 261/25,
261/111
[51] Int. Cl. .................................................. B01d 47/06
[50] Field of Search .......................................... 261/25,
109, 110, 111, 112, 108, DIG. 11

[56] References Cited
UNITED STATES PATENTS

| 2,854,090 | 9/1958 | Slough | 261/DIG. 11 |
| 3,195,870 | 7/1965 | Gruber et al | 261/25 |
| 3,230,408 | 1/1966 | Bandot | 310/67 |
| 3,253,819 | 5/1966 | Talbot | 261/DIG. 11 |
| 3,286,999 | 11/1966 | Takeda | 261/DIG. 11 |
| 3,318,586 | 5/1967 | Meredith | 261/DIG. 11 |
| 3,322,409 | 5/1967 | Reed | 261/111 |
| 3,363,885 | 1/1968 | Meek | 261/112 |

Primary Examiner—Tim R. Miles
Assistant Examiner—Steven H. Markowitz
Attorney—Herbert H. Goodman ABSTRACT: A gas liquid contacting device, such as a cooling tower, which utilizes substantially vertical pipes to (i) distribute liquid to the device, and (ii) act as a structural support for the device. These pipes are interconnected by other pipes to allow liquid which is being passed into the device to be distributed into the substantially vertical pipes. The pipes may also be used as a support for one or more fans to move the gas.

Patented Aug. 3, 1971
3,596,884
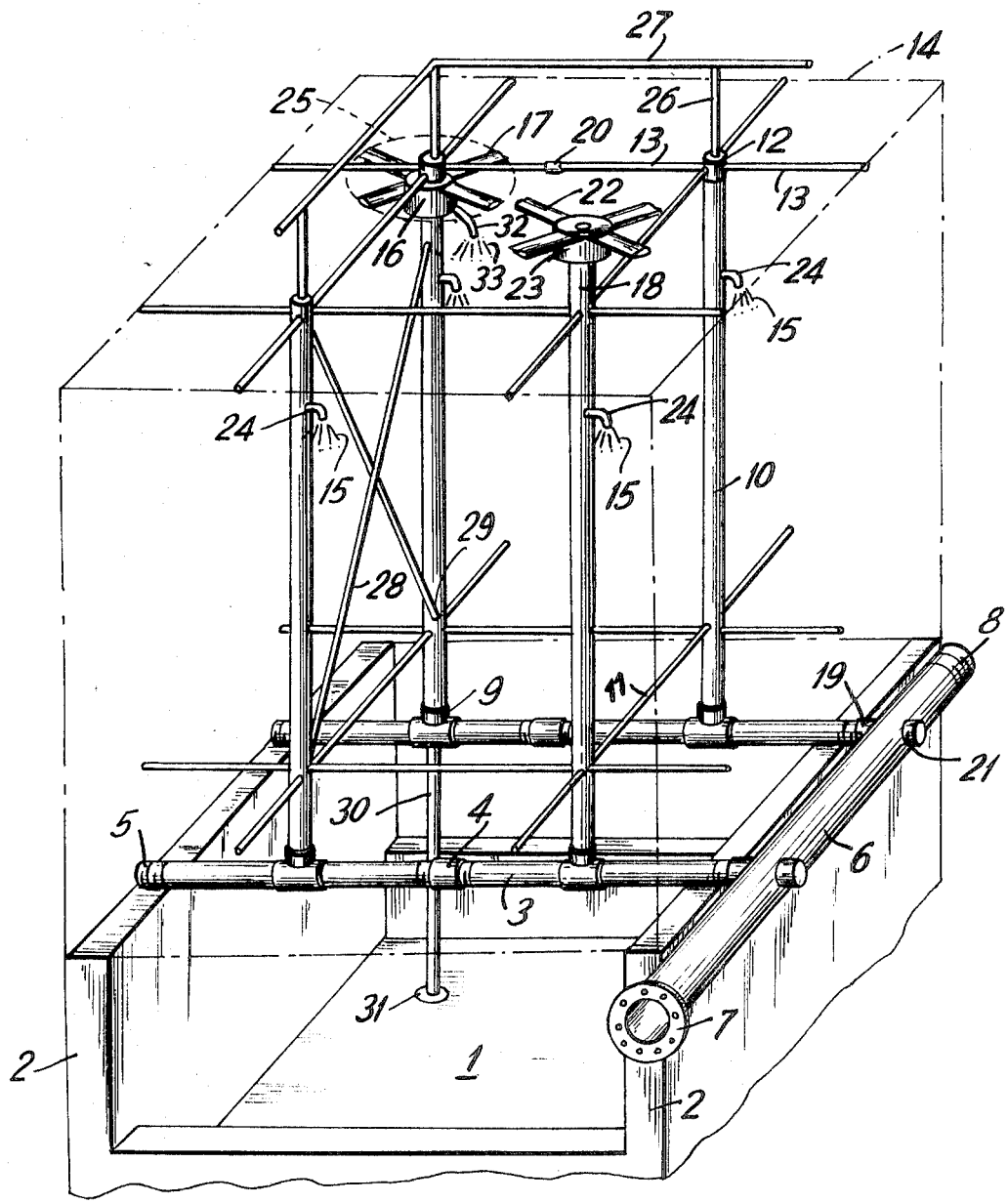
INVENTOR.
EDMUND MURPHY
BY
Herbert H. Goodman
ATTORNEY

COOLING TOWER STRUCTURES

BACKGROUND OF THE INVENTION

This application is a continuation of copending application Ser. No. 674,184, filed Oct. 10, 1967 and now abandoned.

In the construction of water cooling towers and gas liquid contacting apparatus there is usually a supporting structure (framework) for supporting live loads, such as wind, snow, etc., and for supporting dead loads which include the contacting surface for the gas-liquid interface and the gas moving equipment and a separate means of introducing the liquid to the said contacting surface. A disadvantage of this system is that a substantial amount of pipework is used in the cooling tower or gas-liquid contacting apparatus to carry water or other liquid and the framework has to be made in a strong manner to support this pipework with the result that more material has to be used in the cooling tower or gas liquid contacting apparatus with a resultant increase in cost. A further disadvantage of this system is that the gas or air moving equipment or fans are usually supported on top or to one side of the structural framework with the result that it is usually only economic to mount large diameter fans on large cooling towers and the use of small diameter fans is confined to small cooling towers.

SUMMARY OF THE INVENTION

The present invention provides a gas liquid contacting device wherein the pipes which distribute the liquid in the device to contact the gas also serve as structural bearing members, together forming a load bearing structure carrying at least a part of the total dead load and live load which the device and its housing must carry. In its most common embodiment, the gas liquid contacting device comprises substantially vertical pipes provided with means for discharging liquid, and interconnected by other pipes. These other pipes are connected to a liquid feed source and distribute liquid into the substantially vertical pipes. The substantially vertical pipes are interconnected at suitable positions to provide a framework which functions as a structural support as aforesaid.

The gas liquid contacting devices commonly use fans to move the gas through the device. The present invention contemplates utilizing energy in the liquid to rotate one or more hydraulic motors connected to one or more fans situated on the structure. The pipes may be utilized as a shaft for the hydraulic motor or as a bearing in which or around which the hydraulic motor rotates.

BRIEF DESCRIPTION OF THE DRAWING

FIG. 1 is a partial perspective drawing of a portion of a water cooling tower depicting the pipework structure above a basin for holding water.

DESCRIPTION OF THE PREFERRED EMBODIMENTS

In a preferred embodiment of the invention, substantially vertical pipes situated above a tank arranged for collecting liquid from the gas liquid contacting device, are interconnected at suitable positions by other pipes to allow the liquid which is being passed into the device to be distributed into the substantially vertical pipes. These substantially vertical pipes are provided with means for discharging the liquid at suitable positions in respect of the gas-liquid contacting surface. The aforesaid pipes are also interconnected at suitable positions to provide a framework which is capable of carrying dead loads and wind loads and the like which may be imposed upon it. This framework may be constructed to support the entire structure including the housing, or a structure of wood, concrete, steel, and the like may be combined with the structure composed of substantially vertical pipes, the whole forming the cooling tower structure.

It is a feature of the structure that it may be readily arranged so that it is constructed from components which, by being used in a regular pattern relationship, may be used to construct gas liquid contacting devices ranging in size from a few feet in dimension to devices many tens of feet in size.

It is a further feature of the structure that gas moving equipment such as fans may be incorporated within the framework by supporting them on the substantially vertical pipes in such a way that the fan can rotate in a substantially horizontal plane. The device is particularly suitable for the use of many small fans which may be located on any or all of the substantially vertical pipe members.

It is a further feature of this invention that liquid from the substantially vertical pipes may be allowed to pass into a suitable device to spread the liquid over the contacting surface or the liquid may first be passed through a suitable liquid impelled device such as a hydraulic motor which is connected to the gas moving equipment or fan before being allowed to flow over the gas liquid contacting surface.

The gas moving equipment or fan with its driving unit may be arranged to rotate on a shaft or bearing located on the substantially vertical pipework. The gas moving equipment or fans may also be located above, below or to one side of the device.

It is a further feature of the invention that the gas moving equipment may take the form of a chimney to create the necessary movement of the air thus dispensing with the fans.

In a typical application using the said structure, wind loads up to 40 pounds per square foot has to be accommodated as well as dead loads due to equipment and the like. For such an application and with vertical pipes carrying the liquid positioned from 2 feet to 12 feet apart, the said vertical pipes will vary in size from 1 inch to 6 inches in diameter with wall thicknesses from one-sixteenth inch to five-eighths inch when fabricated from steel or other metal. Plastic, wood and other similar materials may be used with a corresponding increase in wall thickness to from one-tenth inch to 2 inches thick and any diameter.

A preferred embodiment of the invention is in the form of a series of substantially vertical pipes positioned above a tank or basin. The pipes are connected by other pipes to provide passages for liquid being supplied to one or more inlets, thus allowing the liquid to flow in substantially equal amounts into the substantially vertical pipes. The substantially vertical pipes are additionally where necessary interconnected to form a structural framework capable of carrying the gas-liquid contacting surface, walls, top covering, gas moving equipment, handrailing, dead loads, wind loads, and the like.

The nature of the interconnections is immaterial to the invention and they may take the form of rigid protrusions from the substantially vertical pipes to create a rigid framework or alternatively a series of ties and struts may be used to create what is known to Engineers as a "pin-jointed" structure. Alternatively a combination of these two methods may be used. The method of fixing the interconnecting framework to the substantially vertical pipes is also immaterial to the invention and may take the form of welding, riveting, screwing, or bolting the interconnecting members into position. The position of the interconnecting water passages of the substantially vertical pipes may be above, below or intermediately placed with respect to the gas liquid contacting surface.

The gas moving equipment may take the form of one or more fans or a chimney arranged above the structure to create a movement of gas. In the case of one fan this may be positioned above or to one side of the structure in a substantially horizontal or vertical position. In the case of a multiplicity of fans the same positions may be adopted but it is more desirable to position the fan unit at or near the top of the substantially vertical pipes so that the fan unit revolves on a hollow bearing about a fixed shaft. In the case of a fan driven by a hydraulic motor from liquid passing through the substantially vertical pipes, the liquid after passing through the hydraulic motor is then passed over the gas liquid contacting device. Alternatively the fan may be driven by an electric motor which is arranged so that the outer case of the motor rotates about the inner fixed part of the motor attached to the substantially vertical pipes. Alternatively if the fan is positioned above the structure a more conventional electric motor may be used wherein the outer case is fixed and the inner shaft upon which the fan is positioned rotates.

In carrying the invention into effect in the case of a rectangular water cooling tower a typical arrangement is shown in FIG. 1. Water to be cooled enters the cooling tower through the inlet flange 7 and flows along the pipe 6 which connects to the pipes 3 by means of connections 19. The pipes 6 are supported above the basin floor 1 either by the walls 2 or columns or pipes 30 which may be provided with foot mounting 31 resting on the basin floor 1. Fittings 9 on the pipes 3 provide connections for the substantially vertical pipes 10 which may be provided with discharge points 24 to discharge the water 15 into the cooling tower which may be provided with suitable gas-liquid contacting device in the space below the discharge points. The pipes 10 are interconnected where necessary by connections 11, 13 and 28 to form a framework capable of carrying a cooling tower indicated by the broken outline 14. In FIG. 1 alternative means of achieving this result are shown. Thus the arms 11 and 13 may be made sufficiently strong that no bracing 28 is required. Alternatively bracing 28 may be provided and lighter arms 11 and 13 used. The bracing need not necessarily interconnect all the vertical pipes 10 and sufficient only need be provided on the strength of the members 11, 13 and 28, the method of fixing at 29 and the size of the cooling tower. Further the interconnecting arms 13 may be joined by a connection 20 so that the cooling tower may be constructed from a number of 'module' parts each associated with its own vertical pipe 10. Alternatively the arms 13 can be made to span the entire distance between the vertical pipes 10. Increase in the height of the cooling tower can be obtained by increasing the lengths of the pipe 10 and providing additional arms 11 and 13 as necessary. The arms 13 may, if desired, be fixed to connections 12 which are fitted to the pipe 10. The plan area of the cooling tower can be increased by extending the pipes 3 at 5 and providing additional vertical pipes 10 and/or alternatively extending the inlet pipe 6 at 8. Further additional connections 21 can be provided on the opposite side of the pipe 6 so that pipes similar to 3 may be positioned as desired. Fans to move the air through the cooling tower may be located either above or on one side of the structure or preferably inside the structure. Such a fan 17 is positioned below an opening 25 in the top of the cooling tower and is driven by either hydraulic motor 16 driven by the water pressure in the vertical pipe before the water is released over the gas liquid contacting surface via the discharge 32 and the spray 33. An electric motor may alternatively be positioned at 16. Alternatively the air may be moved by a fan 22 driven by a hydraulic or electric motor 23 situated on the pipe extension 18. In this case the fan may rotate on a shaft from the motor axis rather than on the motor casing. Handrails 27 may be supported on columns 26 which are fixed to the vertical pipes 10 by the connector 12. It should be noted that the invention is not limited to any specific form of attachment of the substantially vertical pipes 10 to the arms 11 and 13 and the braces 28 and that the device may be constructed of any suitable material such as wood, plastic, metal and the like.

The structural features described hereinbefore provide the gas liquid contacting device of this invention with a number of substantial advantages. The pipes which supply liquid to the gas-liquid contacting surface also serve the dual function to provide a support for the contacting surface and the gas moving equipment, eliminating the necessity for a separate structural framework. These pipes also may support other components in the device such as the walls, fan ring, liquid eliminators, covering, handrails, and the like. The structural support formed by these pipes may also withstand stresses imposed by outside cases such as wind, snow and the like. The structural framework provided by the pipes permit the use of a multiplicity of small fans in an economic manner. The structural device also provides a convenient structure where the fans may be rotated by means of the energy in the liquid supplied to the device, if so desired. Additionally, the device may be manufactured in modules which provide flexibility to design structures of varied sizes with consequent manufacturing economies.

While the principle application of this device will be in water cooling towers, its use is by no means restricted to this field. It may also be used in other similar structural devices such as biological oxidation units, absorption towers for the removal of gases, and the like.

As many embodiments of this invention may be made without departing from the spirit and scope thereof, it is to be understood that the invention includes all such modifications and variations as come within the scope of the appended claims.

I claim:

1. In a gas liquid contact structure having a modular apparatus of predetermined perimetric extent for treating a liquid,
   a plurality of substantially vertically disposed discharge pipes each of which is relatively transversely spaced from the other and positioned inward from the perimeter of the modular apparatus,
   liquid supply pipe means extending into and within the perimeter of said modular apparatus,
   said liquid supply pipe means being substantially horizontally disposed and including a plurality of transversely spaced liquid feeder means connected with and disposed substantially normal to said discharge pipes to support said discharge pipes in their substantially vertical disposition and spaced inward from the perimeter of the modular apparatus,
   a liquid discharge outlet on each of said discharge pipes receiving liquid from said liquid supply pipe means and discharging the same into and within the perimeter of the modular apparatus,
   said liquid discharge outlets being disposed within the perimeter of the modular apparatus to cause the liquid to be discharged from within the modular apparatus and outward, inward and downward toward the perimeter of the modular apparatus to form a cover of liquid over the interior of the modular apparatus,
   said plurality of discharge and supply pipes including said feeder means forming a rigid, free-standing, self-supporting module defining the modular apparatus free of exterior supports and connectable with like self-supporting modules at said liquid supply pipe means,
   a liquid catch basin above which said modular apparatus is mounted to catch the liquid discharged from said discharge outlets,
   a framework about said modular apparatus,
   and means interconnecting said framework to said modular apparatus to partially support said framework from said modular apparatus.

2. In a structure having a modular apparatus as in claim 1,
   a fan on at least one of said plurality of discharge pipes,
   said fan being spaced vertically above the liquid discharge outlet of its respective discharge pipe.

3. In a structure having a modular apparatus as in claim 1, said cooling tower being an updraft type cooling tower for cooling water.